July 2, 1968 H. A. SHERWOOD 3,390,887

DISK CARRIER MECHANISM

Original Filed Feb. 12, 1964 2 Sheets-Sheet 1

INVENTOR
HENRY A. SHERWOOD

BY Arthur A. March
ATTORNEY

DISK CARRIER MECHANISM

Original Filed Feb. 12, 1964

2 Sheets-Sheet 2

INVENTOR.
HENRY A. SHERWOOD
BY Arthur R. March
ATTORNEY

United States Patent Office 3,390,887
Patented July 2, 1968

3,390,887
DISK CARRIER MECHANISM

Henry A. Sherwood, Short Hills, N.J., assignor to Leon Bohn

Continuation of application Ser. No. 344,298, Feb. 12, 1964. This application Oct. 18, 1966, Ser. No. 600,304
21 Claims. (Cl. 274—39)

ABSTRACT OF THE DISCLOSURE

A record disk carrier mechanism for use in a sound transcription machine. The record disk is supported for rotation on a carrier which in turn is supported by a bracket for slidable displacement of said record disk. The record disk being caused to rotate and translate as a result of the rotation of a drive wheel in contact with one surface of said disk and a stylus tip in contact with the other opposed surface of said disk. The opposed pressure resulting from the combined contact also resulting in a constant linear speed being imparted to the disk surface at the stylus tip.

Figure 1:
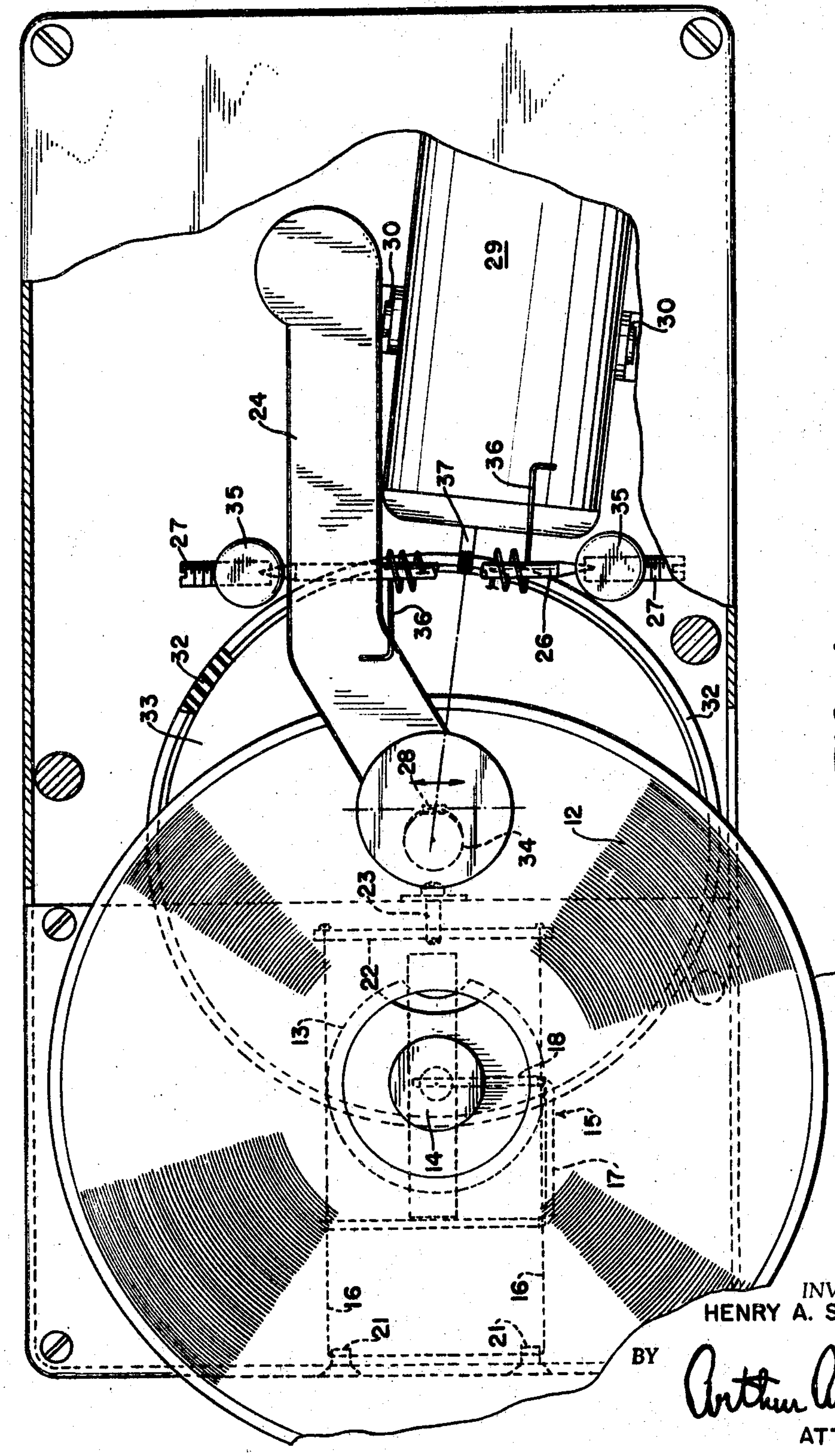

This application constitutes a continuation of application, Ser. No. 344,298, filed Feb. 12, 1964.

This invention relates to a disk carrier mechanism and particularly to a mechanism for use in a sound transcription machine, such as a dictating machine or the like, wherein the information is recorded along a spiral path on the surface of a disk in such a way that the linear speed of the recording is held substantially constant by varying the angular speed of the disk.

Most records for entertainment, as well as for dictation and other non-entertainment purposes, are made with the disk turning at a constant angular velocity. As a result, the linear velocity along the spiral recording path decreases toward the center of the record, which places a limit on the amount of information or the maximum frequency that can be recorded. The reason is that both the maximum frequency and the amount of information are proportional to the linear speed with which the spiral recording path moves past the recording and playback transducer. Since there are fewer linear inches per revolution in the innermost turns of the path than in the peripheral turns, the maximum frequency and the maximum amount of information per linear inch will be determined by the inner turns. This means that the outer turns are used less efficiently in that less information is recorded on the outer turns than could be recorded.

In the present invention, the angular velocity of the disk is varied so as to keep the linear velocity at the point of contact between the transducer and the disk substantially constant for all points along the spiral groove. It is one of the objects of this invention to achieve this variation of angular velocity in a simple way, which is less complicated than the usual structure required for maintaining a constant angular velocity.

Another object is to minimize the number of speed-reducing elements and thus simplify the mechanism and obtain a minimum number of friction points so as to minimize the power requirements of the mechanism. A further object is to increase the recording time for a given bandwidth and given record diameter. A still further object is to reduce side pressures on the recording head so as to reduce the wear thereof. A further object is to increase the uniformity of drive and to permit the use of different sizes of disks. A still further object is to keep the height and other dimensions, as well as the weight, of the mechanism at a minimum.

Still further objects will become apparent hereinafter.

In accordance with the present invention, a disk for recording is mounted for free rotation on a structure. The disk is driven by a motor which has a driving member that may be the shaft of the motor or a gear, or other means attached to the shaft to make contact with a driven ring on a wheel. The wheel has a separate driving ring coaxial with the driven ring and in a different axial plane than the driven ring, and this driving ring makes contact with the disk to supply rotating power to it.

A transducer is mounted close to or in contact with the surface of the disk, substantially directly opposite to the point of contact between the driving ring and the disk, and the support structure on which the disk is rotatably mounted is held by a guide that permits the disk to move so as to change the radial distance between the center of the disk and the point of effective contact of the transducer and the disk. If desired, the disk may have a pre-cut spiral groove therein so that a follower member extending from the transducer can engage the groove and force the disk to move in a direction substantially transverse to the axis of the disk. Alternately, or in addition, the relative points of contact of the follower member and the driving ring, with respect to the disk, may be located so as to force the disk to move along a radial path determined by the guide, so that the transducer will inherently follow a spiral path along a surface of the disk.

Figure 2:
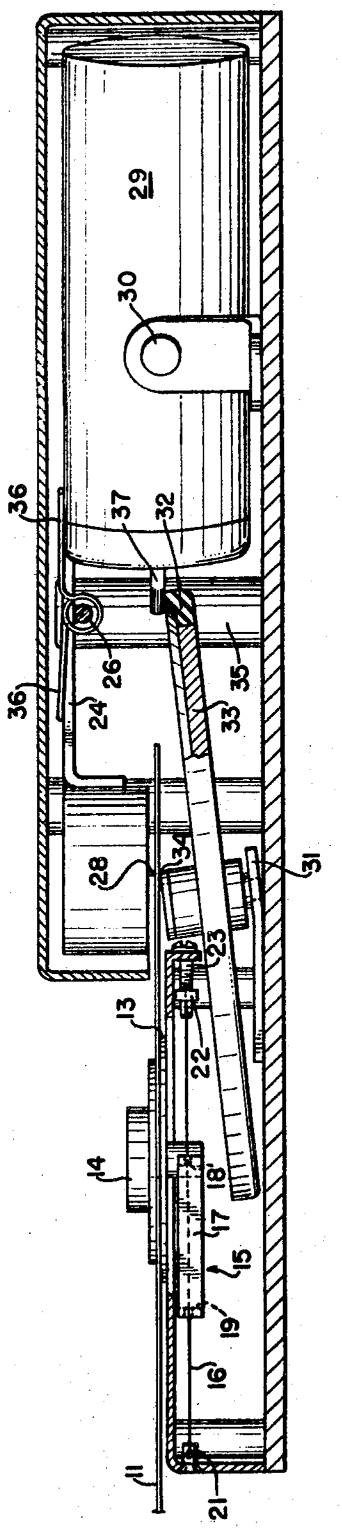

The invention will be described in greater detail in the following specification, together with the drawings in which:

FIG. 1 shows a plan view of a disk driving apparatus constructed according to the invention; and FIG. 2 shows a cross-sectional side view of the apparatus of FIG. 1.

In the apparatus of FIG. 1 the disk on which information is to be recorded is indicated by reference numeral 11. This disk may or may not have a spiral groove preformed in its surface; in a preferred embodiment, there is such a groove 12 which is shown only in part. The recording medium may be of any suitable type, and, again in a preferred embodiment, a magnetic recording material on the grooved surface has been found to be highly satisfactory.

The record disk 11 is supported on a carrier 13 which, in turn, is supported by a slide 15. The slide 15 is slidably mounted on a wire 16 which is bent into the form of a U. The slide 15 is U-shaped or, to be more explicit, J-shaped and is provided with a base portion 17 and two arms 18 and 19 extending perpendicular thereto. The arm 19 has two holes which fit snugly around the wire 16, but with sufficient clearance to remove substantially all friction between the wire and the arm 19. The arm 18 also has a hole that fits around the wire 16 to keep the slide 15 properly aligned with respect to the wire, and in addition, the arm 18 maintains the support for carrier 13. The base portion of the "U" is hooked over two hangers 21 and the ends of the wire are held by a bar 22. A screw 23 adjusts the position of the bar 22 so as to hold the ends of the wire taut and keep them perfectly parallel in order to permit free movement of the slide 15 along the wire.

An arm 24 supported by a rod 26, the ends of which are mounted in pivot bearings 27, supports a transducer head, the essential portion of which, in the case of a magnetic transducer, is the pole pieces 28 which bear directly upon the magnetic material on the upper surface of the record 11.

The driving mechanism includes a motor 29 mounted on a pivot support 30 and having a drive member in the form of a shaft 37 which bears upon the periphery 32 of a drive wheel 33. While this wheel acts as a drive wheel with respect to other elements, it is, of course, a driven member so far as the relationship with the motor 29 is concerned, and the periphery 32 may be considered as a driven ring. In order to assure that there will be substantially no slippage between the shaft 31 and the peripheral ring 32, the latter may be made of rubber or other suitable elastic material.

The driving mechanism may be seen better in FIG. 2, which shows that the drive wheel 33 is mounted at an angle and upon a tilted support 31 so that the majority of the drive wheel extends under the record 11 even though the point of contact between the shaft 31 and the periphery 32 is in substantially the same plane as the record 11.

Power is transmitted from the drive wheel 33 to the record 11 by way of a drive ring 34 which is concentric with the drive wheel 33, but is raised above the plane of the drive wheel. The drive ring 34 also preferably is an elastic rubber disk or ring to make non-slipping contact with a point on the undersurface of the record 11. This point of contact is not truly a single point, but is a small area and the placement of this area on the undersurface of the record 11 is such as to impart substantially tangential movement to the record, thereby causing the latter to rotate upon the carrier 13. Since the tangential force is constant, the linear speed of movement of the record past the pole pieces 28 is also constant so that exactly the same amount of information may be recorded per linear inch at the peripheral portion of the spiral groove as at the portion nearest the center. Of course, the record will turn faster, which is to say that the record will have a greater angular velocity, when the pole pieces 28 are in contact with a portion of the spiral groove near the center of the record than when the pole pieces are in contact with a portion of the spiral groove near the periphery.

The pole pieces 28 may engage the groove 12 of the record and furnish the radial pressure on the side of the groove to force the record, together with the carrier 13 and the slide 15, to slide along the wire 16 in a direction which will be along one of the radii of the record. This has the advantage that the transducer head always makes exactly the same angle with respect to the spiral path. In the case of most record players, the transducer is pivoted so that the angle that it makes with respect to the path varies from point-to-point, which introduces another distorting factor that is overcome by the arrangement of the present invention.

In addition to radial pressure from the pole pieces 28 on the record, the point of contact between the drive ring 34 and the undersurface of the record 11 may be shifted slightly with respect to the point of contact of the pole pieces 28 in the directions indicated by the double-ended arrow in FIG. 1 to develop radial pressure on the record. By shifting the point of contact the proper amount, a force may be added to the tangential force which will be just sufficient to cause the record to move along the wire 16. The degree of such motion along the wire depends on the extent to which the point of contact is offset and, by making the arm 24 movable sideways, it is possible, in effect, to tune the radial motion of the record to any desired degree so as to eliminate completely any side friction on the magnetic head. By making the pivot bearings 27 in the form of a pair of set screws adjustably held in support members 35, the sideways position of the arm 24 may be easily adjusted. Furthermore, pressure may be exerted on the arm by a spring 36 wound around the rod 26 with one end of the spring bearing on the arm 24 to press it down and with the other end of the spring bearing on the motor 29 to press the shaft 37 against the driven ring 32. The latter end of the spring 36 may be bent over adjustably to press at different points along the motor 29 at different distances from the axis of the pivot support 30 so that the effective pressure of the shaft 37 against the ring 32 may be adjusted while the pressure of the arm 24 on the disk 11 is held constant.

It should be noted that the device, as described, requires only one rotating element between the record 11 and the shaft 37 of the motor. This has the advantage that there are less bearings and rolling surfaces to produce friction which would cause a drain on the source of power that drives the motor and, furthermore, there are less idler wheels to wear out or to go flat than is usually the case in record players. In addition, the resultant saving of space and weight is quite important in a device such as this, which is preferably designed for portability. By virtue of the arrangement of the present invention, a speed reduction of the order of 500 to 1 is made possible by the speed of the shaft 37 and the speed of the record disk 11. Moreover, there is only one location at which concentricity need be considered and that is the concentricity between the support drive ring 34 and the driven ring 32. The lack of other driven members and other driving members substantially eliminates problems of wow and flutter in the instrument.

Because of the fact that the driving force to rotate the record 11 is developed by the opposing pressure between the pole pieces 28 and the driving ring 34, when the arm 24 is lifted, the record stops immediately. Also, it restarts immediately as soon as the arm is permitted to drop down again. In accordance with the present invention the friction between the driving ring 34 and the disk 11 is greater than the friction between the pole pieces 28 and the disk 11. As a consequence, a great advantage is obtained in that when dirt or dust enters the groove in any excess amounts, the friction between the pole pieces 28 and the disk 11 is increased whereupon the record automatically stops. Thus, a severe difficulty of the prior art is overcome in that dirt is not dragged along the groove with the consequent abrasive action which would cause immediate wear on the transducer head.

In view of the importance attached to portability, special attention should be paid to the diagonal arrangement of the drive wheel 33, as shown in FIG. 2. This arrangement permits the closest possible grouping of the major space consuming elements and allows the mechanism to be constructed in a volume of minimum size.

What is claimed is:

1. A disk carrier mechanism comprising a disk; a central pin; means to support a disk for rotation about said central pin; a motor having a drive member; a wheel having a driven ring engaging said drive member and having a drive ring concentric with said driven ring and of different diameter and axially separated from said driven ring to make driving contact with one surface of said disk; a slidable support means for said central pin; a guide extending substantially parallel to the surface of said disk, said support being freely slidable on said guide in a substantially radial direction with respect to the axis of said disk to permit the point of contact between said driving ring and said disk to change radially with respect to said disk; a transducer located substantially in contact with said disk and substantially directly opposite the point of contact between said driving ring and said disk and on substantially the same radius from the center of said disk but on the remote side of said disk from said point of contact; and means pivotally mounting the transducer so that the engagement of the transducer with the disk imparts a pressure to said disk when said disk is in contact with said drive ring causing the disk to be driven while movement of the transducer from the disk ends disk rotation.

2. A disk carrier mechanism comprising: a disk; a central pin; means to support said disk for rotation; a motor having a drive member; a wheel having a driven ring engaging said drive member to be rotated thereby and having a drive ring concentric with said driven ring and of smaller diameter and axially separated from said driven ring to make driving contact between one point of the periphery of said drive ring and one point of one surface of said disk, the axis of said wheel being at an angle with respect to the axis of said disk; a slidable support means for said rotatable support means; a guide extending substantially parallel to the surface of said disk, said support being freely slidable on said guide in a substantially radial direction with respect to the axis of said disk to permit the point of contact between said drive ring and said disk to change radially with respect to said disk; a transducer located substantially in contact with said disk and substantially directly opposite the point of contact between said driving ring and said disk and on substantially the same radius from the center of said disk but on the remote side of said disk from said point of contact; and means pivotally mounting the transducer so that the engagement of the transducer with the disk imparts pressure to said disk when said disk is in contact with said drive ring causing the disk to be driven while movement of the transducer from the disk ends disk rotation.

3. The disk carrier mechanism of claim 2 in which at least the surface of said disk facing said transducer has a spiral groove and said transducer engages said spiral groove to maintain proper driving relationship between said disk and said drive ring.

4. The disk carrier of claim 2 in which the axis of said drive member is substantially perpendicular to the axis of said disk.

5. The disk carrier of claim 4 in which said drive member is substantially in the same plane as said disk.

6. A disk carrier mechanism comprising a disk having a spiral groove in one surface; a motor having a drive shaft; a single rotating member engaging said shaft to be rotated thereby, the other surface of said disk resting on one point of said rotating member for rotation of said disk; a transducer pivotally mounted to make contact with said one surface substantially directly opposite the point of contact between said rotating member and said disk and on substantially the same radius from the center of said disk; and means pivotally mounting the transducer so that the engagement of the transducer with the disk imparts a pressure to said disk when said disk is in contact with said drive ring causing the disk to be driven while movement of the transducer from the disk ends disk rotation.

7. A disk carrier mechanism comprising a disk having a spiral groove in one surface and a layer of ferromagnetic recording material on said surface and in said groove, the other surface of said disk being substantially smooth; a motor having a drive shaft; a single rotating member engaging said shaft to be rotated thereby, said smooth surface of said disk resting on one point of said rotating member for rotation of said disk; a transducer pivotally mounted to make contact with said one surface substantially directly opposite the point of contact between said rotating member and said disk and on substantially the same radius from the center of said disk; and means pivotally mounting the transducer so that the engagement of the transducer with the disk imparts a pressure to said disk when said disk is in contact with said drive ring causing the disk to be driven while movement of the transducer from the disk ends rotation.

8. A disk carrier mechanism comprising: a disk having a spiral groove in one surface; support means for said disk; a guide extending substantially parallel to the surface of said disk, said support means being freely slidable on said guide in a substantially radial direction with respect to the axis of said disk; a motor having a drive member; a wheel having a driven ring engaging said drive member to be rotated thereby and having a drive ring concentric with said driven ring and of smaller diameter, the plane of said drive ring being axially spaced above the plane of said driven ring to permit said drive ring to make driving contact between one point of the periphery of said drive ring and one point of the other surface of said disk; a transducer located substantially in contact with said one surface of said disk and substantially directly opposite the point of contact between said driving ring and said disk and on substantially the same radius from the center of said disk; and means pivotally mounting the transducer so that the engagement of the transducer with the disk imparts a pressure to said disk when said disk is in contact with said drive ring causing the disk to be driven while movement of the transducer from the disk ends disk rotation.

9. The disk carrier of claim 8 in which said guide comprises a pair of wires parallel to a radius of said disk and means pivotally mounting the transducer so that the engagement of the transducer with the disk imparts a pressure to said disk when said disk is in contact with said drive ring causing the disk to be driven while movement of the transducer from the disk ends disk rotation.

10. The disk carrier of claim 8 in which said point of contact between said driving ring and said disk causes said driving ring to exert both a tangential and a radial pressure on said disk.

11. The disk carrier of claim 8 in which said guide causes said support means to move along a path substantially radially away from the point of contact of said driving ring and said disk.

12. The disk carrier of claim 11 in which said driving ring is located between said rotatable support means and said drive member.

13. A disk carrier mechanism comprising: a disk having a spiral groove in one surface; rotatable support means for said disk; a guide extending substantially parallel to the surface of said disk, said support means being freely slidable on said guide in a substantially radial direction with respect to the axis of said disk; a motor having a drive member; a wheel having a driven ring engaging said drive member to be rotated thereby and having a drive ring concentric with said driven ring and of smaller diameter, the plane of said drive ring being axially spaced above the plane of said driven ring to permit said drive ring to make driving contact between one point of the periphery of said drive ring and one point of the other surface of said disk; a transducer located substantially in contact with said one surface of said disk and substantially directly opposite the point of contact between said driving ring and said disk and on substantially the same radius from the center of said disk; and means pivotally mounting the transducer so that the engagement of the transducer with the disk imparts a pressure to said disk when said disk is in contact with said drive ring causing the disk to be driven while movement of the transducer from the disk ends disk rotation.

14. The disk carrier of claim 13, in which said transducer makes contact with said disk at a point to drive said disk radially during each revolution of the disk a linear distance substantially equal to the radial distance between immediately adjacent grooves.

15. The disk carrier of claim 13 in which said transducer makes contact with said disk at a point which may be varied substantially tangentially with respect to said disk to produce a radial force on said record causing said support means to slide longitudinally along said guide.

16. The disk carrier of claim 15 in which said transducer makes contact with said disk at a point to drive said disk radially at a linear distance per revolution of the disk which is substantially equal to the radial distance between portions of said groove which are exactly one revolution apart.

17. A disk carrier mechanism comprising a disk having a spiral groove on a surface and a layer of ferromagnetic recording material on said surface and in said groove; support means for supporting said disk for rotation, said disk resting on said support means with one surface facing downwardly; a guide extending substantially parallel to the surfaces of said disk and below said downwardly facing surface, said support means being freely slidable on said guide in a substantially radial direction with respect to the axis of said disk; a motor having a drive shaft; a wheel having a resilient peripheral driven ring engaging said shaft to be rotated thereby at substantially constant angular speed much lower than the angular speed of said shaft; a central raised pedestal concentric and rigidly attached to said wheel; said downwardly facing surface of said disk resting on one point of said drive ring; and a transducer mounted to make contact on the other surface of said disk.

18. The disk carrier of claim 17 in which said wheel lies in a plane which intersects said shaft at an angle and in which said drive ring lies in a second plane which intersects said smooth surface of said disk at an angle.

19. The disk carrier of claim 18 in which said disk overlaps more than half of said wheel.

20. A disk carrier mechanism comprising a disk having a spiral groove in one surface and a layer of ferromagnetic recording material on said surface and in said groove, the other surface of said disk being substantially smooth; a motor having a drive shaft; a single rotating member engaging said shaft to be rotated thereby, the other surface of said disk resting on one point of said rotating member for rotation of said disk, and a transducer pivotally mounted and having magnetic pole pieces in contact with said one surface substantially directly axially opposite the point of contact between said rotating member and said disk, said pole pieces exerting a lower frictional force on said disk than the frictional force of said rotating member on said disk.

21. The disk carrier of claim 20 including resilient means bearing on said motor to press said shaft against said rotating member, said resilient means also bearing against said transducer to press said magnetic pole pieces against said disk.

References Cited

UNITED STATES PATENTS

| | | | |
|---|---|---|---|
| 3,249,360 | 5/1966 | Beer | 274—9 |
| 2,452,133 | 10/1948 | Leitner et al. | 274—13 |

LEONARD FORMAN, *Primary Examiner.*

FELIX J. D'AMBROSIO, *Assistant Examiner.*